United States Patent
Kim et al.

(10) Patent No.: US 8,175,184 B2
(45) Date of Patent: May 8, 2012

(54) METHOD FOR TRANSMITTING BEAM FORMING INFORMATION AND A METHOD FOR TRACKING POSITION OF A MOBILE STATION IN MULTI INPUT MULTI OUTPUT SYSTEM USING CODEBOOK-BASED BEAM FORMING SCHEME

(75) Inventors: Jae Wan Kim, Anyang-si (KR); Bin Chul Ihm, Anyang-si (KR); Jin Young Chun, Anyang-si (KR); Jin Hyuk Jung, Anyang-si (KR); Su Nam Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/680,059

(22) PCT Filed: Nov. 4, 2008

(86) PCT No.: PCT/KR2008/006492
§ 371 (c)(1),
(2), (4) Date: Dec. 17, 2010

(87) PCT Pub. No.: WO2009/061116
PCT Pub. Date: May 14, 2009

(65) Prior Publication Data
US 2011/0090976 A1   Apr. 21, 2011

(30) Foreign Application Priority Data
Nov. 5, 2007   (KR) .................. 10-2007-0112024

(51) Int. Cl.
*H04B 7/02* (2006.01)
(52) U.S. Cl. .................. 375/267; 375/260; 375/295
(58) Field of Classification Search .................. 375/260, 375/267, 295; 455/69
See application file for complete search history.

(56) References Cited

U.S. PATENT DOCUMENTS

| | | | |
|---|---|---|---|
| 6,754,473 B1 * | 6/2004 | Choi et al. | 455/101 |
| 2004/0104844 A1 * | 6/2004 | Rooyen et al. | 342/377 |
| 2007/0115909 A1 * | 5/2007 | Wang et al. | 370/342 |
| 2007/0206626 A1 | 9/2007 | Lee et al. | |

FOREIGN PATENT DOCUMENTS

| | | |
|---|---|---|
| KR | 10-2001-0036597 A1 | 5/2001 |
| KR | 10-2002-20089094 A | 11/2002 |

* cited by examiner

*Primary Examiner* — Chieh M Fan
*Assistant Examiner* — Sophia Vlahos
(74) *Attorney, Agent, or Firm* — McKenna Long & Aldridge LLP

(57) ABSTRACT

A method for transmitting feedback information in a codebook-based multiple-input multiple-output (MIMO) system is disclosed. For example, a method for transmitting beamforming information in a MIMO system using a codebook-based beamforming scheme includes receiving a signal and estimating a reception channel, and transmitting beamforming information selected through the estimated channel information from a codebook which is updated using phase shift matrices having a phase value as a parameter and using previous beamforming information.

6 Claims, 5 Drawing Sheets

METHOD FOR TRANSMITTING BEAM FORMING INFORMATION AND A METHOD FOR TRACKING POSITION OF A MOBILE STATION IN MULTI INPUT MULTI OUTPUT SYSTEM USING CODEBOOK-BASED BEAM FORMING SCHEME

This application is a 35 U.S.C. §371 National Stage entry of International Application No. PCT/KR2008/006492, filed on Nov. 4, 2008, and claims priority to Korean Application No. 10-2007-0112024, filed on Nov. 5, 2007 each of which is hereby incorporated by reference in its entirety as if fully set forth herein.

TECHNICAL FIELD

The present invention relates to a codebook-based multiple-input multiple-output (MIMO) system, and more particularly, to a method for transmitting beamforming information and a method for tracking the location of a mobile station in a MIMO system using a codebook-based precoding scheme.

BACKGROUND ART

With the popularization of information communication services, the emergence of various multimedia services, and the provision of high-quality services, demand for a wireless communication service has increased. To actively cope with such demand, first of all the capacity of a communication system should be increased. To increase communication capacity in wireless communication environments, a method for newly searching available frequency bands and a method for increasing efficiency for limited resources may be considered. As to the latter method, a multiple transmit/receive antenna technique has recently drawn attention and has been actively developed. The multiple transmit/receive antenna technique obtains a diversity gain by equipping a transmitter and a receiver with a plurality of antennas to additionally ensure a spatial region for utilizing resources, or increases transmission capacity by transmitting data in parallel through the plurality of antennas.

A multiple antenna system using an orthogonal frequency division multiplexing (OFDM) requires various techniques to improve the reliability of data transmission. A scheme for raising a spatial diversity gain includes space-time coding (STC), cyclic delay diversity (CDD), etc. A scheme for increasing a signal-to-noise ratio (SNR) includes beamforming, precoding, etc. The beamforming and precoding schemes are used to maximize the SNR through corresponding feedback information in a closed-loop system which is capable of using feedback information in a transmitting end.

A MIMO precoding scheme is one MIMO system scheme for improving communication performance by feeding back a part of or all channel information using a closed-loop mode. The precoding scheme has an advantageous effect, especially in a slow fading environment of less than 30 Km per hour.

Examples of the precoding scheme in a closed-loop system are a method for quantizing channel information and feeding back the quantized information, and a codebook-based precoding method which is used when feedback information is finite. The codebook-based precoding method refers to a scheme for obtaining an SNR gain by feeding back an index of a precoding matrix which is previously known to transmitting and receiving ends to the transmitting end.

The beamforming scheme includes a general beamforming scheme, a codebook-based beamforming scheme, and a scheme using a combination of beamforming and MIMO schemes.

Figure 1A:
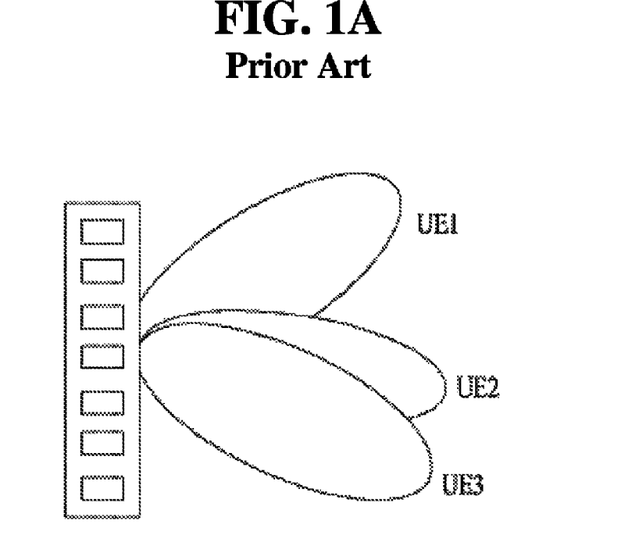
FIGS. 1A, 1B, and 1C are views explaining a method for implementing a beamforming scheme.
Figure 1B:
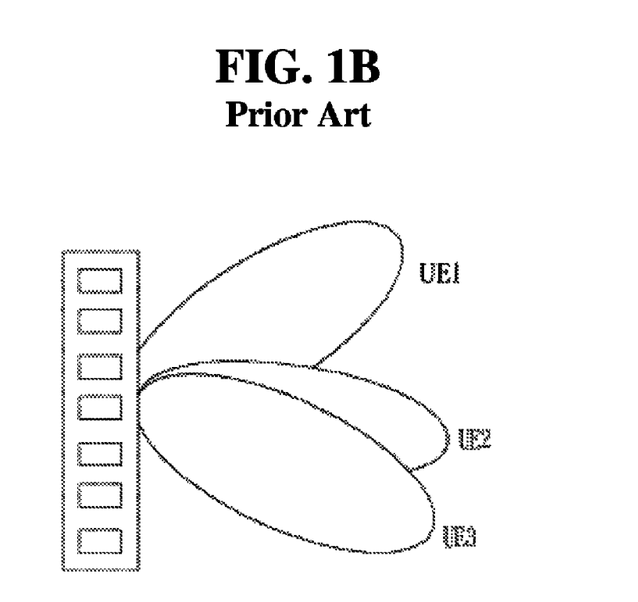
Figure 1C:
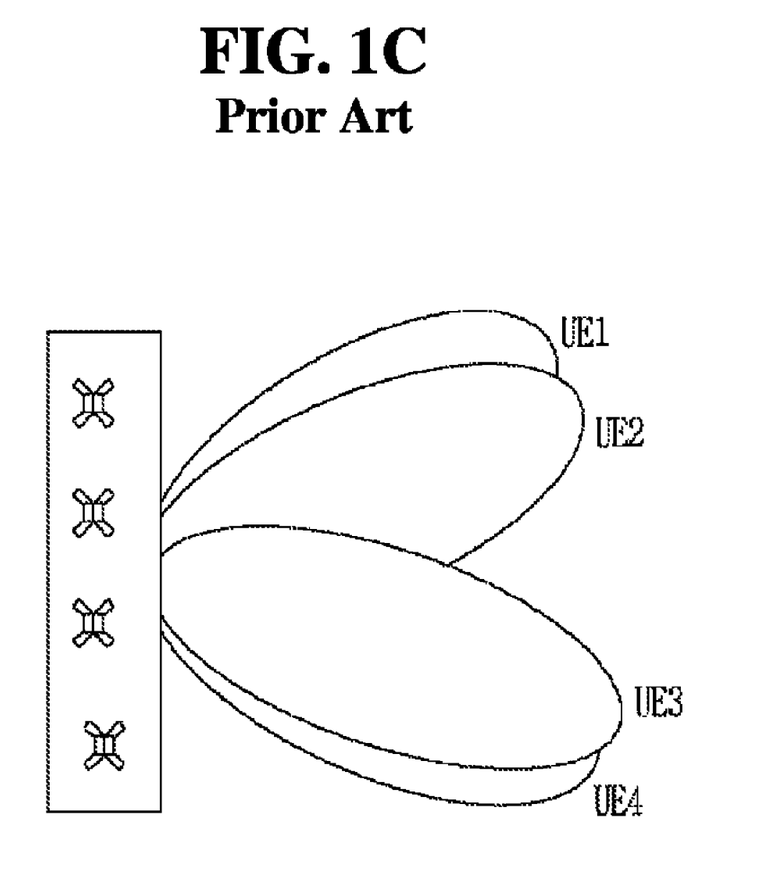

FIGS. 1A, 1B, and 1C are views explaining an example of a beamforming scheme and illustrate beam shapes formed through antennas when using the beamforming scheme.

FIG. 1A illustrates a beam shape formed through antennas when a general beamforming scheme is used. The general beamforming scheme refers to adaptive beamforming in which a weight vector for beamforming of a transmit antenna is updated according to direction of arrival (DoA). For example, an optimum antenna weight is calculated using a Wiener solution which can be obtained by a Wiener equation to eliminate signals received from unnecessary directions, thereby increasing the reception performance of an SNR.

FIG. 1B illustrates a beam shape formed through antennas when a codebook-based beamforming scheme is used. The codebook-based beamforming scheme has a simple configuration as shown in FIG. 1B and may correspond to fixed beamforming. The codebook-based beamforming improves performance by causing multiple users to simultaneously select an optimal beam. An example of the codebook may be a codebook based on a discrete Fourier transform (DFT) matrix.

FIG. 1C illustrates a beam shape formed through antennas when a scheme using a combination of beamforming and MIMO schemes is used. In this case, the conventional MIMO scheme and the beamforming scheme can be simultaneously supported using X-pol antennas of an X shape as illustrated in FIG. 1C.

A frequency division duplex (FDD) mode using separate frequency bands for uplink/downlink transmission has a difference in characteristics between uplink and downlink channels for calculating an antenna weight. Accordingly, when using the beamforming scheme, since an antenna weight for beamforming based on an accurate channel estimation result is not generated, a gain loss may occur. Furthermore, the above-described codebook-based beamforming scheme, and the scheme using a combination of the beamforming and MIMO schemes may generate a dead zone where a signal disappears since a user equipment (UE) becomes more distant from a corresponding beam as the user equipment moves, as can be confirmed in FIGS. 1B and 1C.

In addition, when feeding back an antenna weight to a base station from a user equipment using a closed-loop mode, excessive overhead may occur. Feedback overhead can, to some degree, be reduced using a codebook, but a quantization error, which may be generated in the course of quantization of channel information, and an error due to a feedback delay can not be disregarded. To relieve limitations of the utilization of the codebook, research into methods for reducing the quantization error, the feedback delay error, and feedback overhead by flexibly varying elements of the codebook according to variations of a channel in a time or frequency region has recently been conducted.

DISCLOSURE

Technical Problem

An object of the present invention devised to solve the problems lies in providing a method for updating a codebook in a codebook-based MIMO system. Another object of the present invention lies in providing a method for transmitting beamforming information in a MIMO system adapting a codebook-based beamforming scheme. A further object of the present invention lies in providing a method for tracking the location of a mobile station in a MIMO system using a codebook-based beamforming scheme.

Technical Solution

The object of the present invention can be achieved by providing a method for transmitting beamforming information in a MIMO system using a codebook-based beamforming scheme. The method includes receiving a signal and estimating a reception channel, and transmitting beamforming information selected through the estimated channel information from a codebook which is updated using phase shift matrices having phase values as parameters and using previous beamforming information.

The beamforming information may be codeword index information contained in the codebook. The codebook may determine a plurality of phase shift matrices by determining a plurality of phase values, and determine codebook codewords by multiplying each of the determined phase shift matrices by a vector component according to channel information to include the determined codebook codewords.

Each of the phase values may be determined by adding or subtracting an integral number of times of a phase interval, based on at least one of a straight line connecting a transmitting end and a receiving end and the channel information. The phase interval may be generated by equally dividing a predetermined phase range into intervals corresponding to the number of feedback bits.

The beamforming information may be repeatedly transmitted a preset number of times. Each of the phase values may be reset to 0° at a preset repetition period.

Advantageous Effects

According to the present invention, a codebook is updated considering a channel status through an operation in a codebook update mode, and a specific codeword having good reception performance is selected from the updated codebook and is fed back. Then since feedback information considering a time-varying channel can be transmitted without increasing feedback overhead, communication performance can be improved.

Further, while updating a codebook, a new codeword value is determined using a previous feedback codeword value. Therefore, a useful effect can be expected in a location tracking function of a mobile station in a MIMO system using a codebook-based beamforming scheme.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

In some instances, known structures and/or devices are omitted or are shown in block diagram and/or flow chart form, focusing on important features of the structures and/or devices, so as not to obscure the concept of the present invention. The same reference numbers will be used throughout this specification to refer to the same or like parts.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the exemplary embodiments of the present invention, a description is made of a data transmission and reception relationship between a base station and a mobile station. Here, the term 'base station' refers to a terminal node of a network communicating directly with the mobile station. In some cases, a specific operation described as performed by the base station may be performed by an upper node of the base station. Namely, it is apparent that, in a network comprised of a plurality of network nodes including a base station, various operations performed for communication with a mobile station may be performed by the base station, or network nodes other than the base station. The term 'base station' may be replaced with the term 'fixed station', 'Node B', 'eNode B' (eNB), 'access point', etc. The term 'mobile station' may be replaced with the term 'user equipment' (UE), 'mobile subscriber station' (MSS), etc.

The present invention provides a codebook update method which can reflect channel variations in a MIMO system which transmits feedback information using a codebook. In a system using a codebook-based precoding scheme, the present invention may be applied for precoding tracking which is capable of reflecting a channel status using the codebook update method. The present invention may also be applied for location tracking of a mobile station in a system using a codebook-based beamforming scheme. Hereinafter, each vector component constituting the codebook is called a codeword.

In the embodiment of the present invention, a current channel status can be reflected using an extended matrix including a plurality of vector components in order to update a codebook. In this case, the codebook can be updated based on previous transmission using the codebook used for previous transmission or a codeword of the codebook. In consideration of channel characteristics of a received signal, channel variations can be reflected by selectively transmitting a codeword from the updated codebook.

Hereinafter, the embodiment of the present invention will be described. A description will now be given of a codebook update method which uses, as an extended matrix, a phase shift matrix including phase values as parameters and uses, as a base matrix, a discrete Fourier transform (DFT) unitary matrix forming orthogonal beam patterns.

The following Equation 1 illustrates an example of the phase shift matrix including phase values as parameters.

$$P_N(\phi_i) = \begin{pmatrix} 1 & 0 & 0 & \cdots & 0 \\ 0 & e^{j\phi_i} & 0 & \cdots & 0 \\ 0 & 0 & e^{j2\phi_i} & \cdots & 0 \\ \vdots & \vdots & \vdots & \ddots & \vdots \\ 0 & 0 & 0 & \cdots & e^{j(N-1)\phi_i} \end{pmatrix} \quad \text{[Equation 1]}$$

Equation 1 shows a phase shift matrix which can be used especially when the number of rows of a base matrix is N. In Equation 1, $\phi_i$ denotes a phase value determined according to a predefined rule.

One method for determining the phase value $\phi_i$ will now be described. First, a predetermined phase range for determining the phase value is determined. Next, the phase range is equally divided into K ranges to determine one phase interval. Then the phase value $\phi_i$ can be determined using the determined phase range and phase interval. The following Equation 2 shows one example of determining the phase value as a mathematical expression. In Equation 2, each phase value is determined by multiplying an integer by a predefined phase interval. The predefined phase interval is obtained by equally dividing the phase range.

$$\phi_i = \frac{2\pi * i}{KN}, i = 0, 1, 2, \ldots, L-1 \qquad \text{[Equation 2]}$$

Referring to Equation 2, the phase range is determined as $$0° - \frac{2\pi}{N}$$

and the determined phase range is equally divided by K, thereby obtaining one phase interval. Here, N and K are any real numbers. For example, the phase range may be determined according to the number or interval of transmit and receive antenna elements, the number of beam patterns, etc.

Another method for determining the phase value $\phi_i$ will now be described. The number of determined phase values may be the number of codewords included in a codebook. For example, if feedback information is expressed by M bits, the number of channel statuses which can be expressed by M bits, that is, the number of codewords included in the codebook will be $2^M(=L)$. Therefore, the number of phase values is $L(i=0, 1, 2, \ldots, L-1)$.

This may be expressed as shown in the following Equation 3.

$$\Delta\phi = \frac{\phi_{range}}{L} \qquad \text{[Equation 3]}$$

Each phase value may be determined by setting an initial value to 0° or to a phase value determined during previous transmission, and adding or subtracting a value, which is obtained by multiplying the determined phase interval by an integer, to or from the set initial value. This may be expressed by the following Equation 4.

$$\phi_{i,t} = \phi_{t-1} + f(i)\Delta\phi \qquad \text{[Equation 4]}$$

$$f(i) = \left\{-\frac{L}{2}, -\left(\frac{L}{1}-1\right), \ldots, -2, -1, 0, 1, 2, \ldots, \frac{L}{2}-1, \frac{L}{2}\right\}$$

In Equation 4, 't' denotes an index related to the number of codebook updates and may be an integer greater than 1. If that is, if codebook updating is first performed, the phase value may be 0°. As seen from Equation 4, each phase value $\phi_i$ will be evenly distributed to the right and left centering around 0° or a phase value determined during previous transmission.

In Equation 4, f(i) may selectively use L integers among integers between $$-\frac{L}{2} \text{ and } \frac{L}{2}.$$

For example, i may be an integer between $$-\left(\frac{L}{2}-1\right) \text{ and } \frac{L}{2}$$

or an integer between $$-\frac{L}{2} \text{ and } \frac{L}{2}-1.$$

Such a case is advantageous in that the same phase value as a previous phase value can be selected in a codebook updating mode. As another example, i may be an integer between $$-\left(\frac{L}{2}-1\right)$$

and −1 or an integer between 1 and $$\frac{L}{2}.$$

Although at this time the same phase value as the previous phase value in the codebook updating mode can not be selected, a further extended phase value can be selected.

A plurality of phase values is determined through the above-described method, thereby generating a phase shift matrix corresponding to each phase value and performing codebook updating using the phase shift matrix.

The following Equation 5 shows a DFT unitary matrix forming an orthogonal beam pattern.

$$B_1 = \{b_{1,0}, b_{1,1}, \ldots, b_{1,N-1}\} \qquad \text{[Equation 5]}$$

$$= \frac{1}{\sqrt{N}}\left\{\begin{pmatrix}1\\1\\1\\\vdots\\1\end{pmatrix}, \begin{pmatrix}1\\e^{j\frac{2\pi}{N}}\\e^{j2\frac{2\pi}{N}}\\\vdots\\e^{j(N-1)\frac{2\pi}{N}}\end{pmatrix}, \ldots, \begin{pmatrix}1\\e^{j(N-1)\frac{2\pi}{N}}\\e^{j2(N-1)\frac{2\pi}{N}}\\\vdots\\e^{j(N-1)^2\frac{2\pi}{N}}\end{pmatrix}\right\}$$

Here, N denotes an integer determining the number of rows, and may be determined according to the number of transmit antenna elements in case of precoding or according to the number of beam patterns in case of beamforming. The DFT unitary matrix $B_1$ comprised of N column vectors $\{b_{1,0}, b_{1,1}, \ldots, b_{1,N-1}\}$ may be expressed by Equation 5.

Hereinafter, a codebook update method will be described using the aforementioned phase shift matrix and the DFT matrix.

When codebook updating is not performed, or even when it is determined to perform the codebook updating, a codeword $b_{1,k}$ having the best reception performance based on a received signal is selected among codewords of a base codebook, $B_1$, that is, among the column vectors during first feedback. Here, k (where k=0, 1, ..., N−1) is a codeword index within the codebook.

In a codebook updating mode, an existing codebook can be updated by generating a plurality of phase shift matrices so that a channel status of a currently received signal or moving circumstances of a mobile station can be reflected. As described above, a plurality of phase shift matrices is generated according to a plurality of phase values having a phase interval of right and left symmetry corresponding to a codebook size N within a prescribed phase range $\phi_{range}$ centering around a phase value $\phi_i$ of a codeword $b_{1,k}$ used for previous transmission. The generated phase shift matrix may be expressed by the following Equation 6.

$$P_N(\phi_0) = \begin{pmatrix} 1 & 0 & 0 & \ldots & 0 \\ 0 & e^{j\phi_0} & 0 & \ldots & 0 \\ 0 & 0 & e^{j2\phi_0} & \ldots & 0 \\ \vdots & \vdots & \vdots & \ddots & \vdots \\ 0 & 0 & 0 & \ldots & e^{j(N-1)\phi_0} \end{pmatrix}$$

$$P_N(\phi_1) = \begin{pmatrix} 1 & 0 & 0 & \ldots & 0 \\ 0 & e^{j\phi_1} & 0 & \ldots & 0 \\ 0 & 0 & e^{j2\phi_1} & \ldots & 0 \\ \vdots & \vdots & \vdots & \ddots & \vdots \\ 0 & 0 & 0 & \ldots & e^{j(N-1)\phi_1} \end{pmatrix}$$

$$\vdots$$

$$P_N(\phi_{L-1}) = \begin{pmatrix} 1 & 0 & 0 & \ldots & 0 \\ 0 & e^{j\phi_{L-1}} & 0 & \ldots & 0 \\ 0 & 0 & e^{j2\phi_{L-1}} & \ldots & 0 \\ \vdots & \vdots & \vdots & \ddots & \vdots \\ 0 & 0 & 0 & \ldots & e^{j(N-1)\phi_{L-1}} \end{pmatrix}$$

[Equation 6]

An updated codebook can be generated by applying the generated plurality of phase shift matrices to the codeword used for previous transmission. A codeword $b_{2,k}$ is selected by selecting a codeword having the best reception performance based on a received signal, using the updated codebook.

Such a codebook update operation can be performed up to several times. An example of a method for updating a codebook by as many as the number of times between 't' and 't+1' will be described using a mathematical expression by generalizing the above-described codebook update method.

The following Equation 7 shows an example of a codebook update method which can be generated through the number of update operations.

$$B_t = \{b_{t,0}, b_{t,1}, \ldots, b_{t,N-1}\}$$

$$= \{P_N(\phi_0), P_N(\phi_1), \ldots, P_N(\phi_{L-1})\} \times b_{t-1,k}$$

$$= \{P_N(\phi_0) \times b_{t-1,k}, P_N(\phi_1) \times b_{t-1,k}, \ldots, P_N(\phi_{L-1}) \times b_{t-1,k}\}$$

[Equation 7]

In Equation 7, 't' of $B_t$ denotes the number of codebook updates. In the first codebook update operation, 't' is set to 1 and may be increased by 1 whenever the update operation is performed. Moreover, $b_{t-1,k}$ denotes a codeword selected from a codebook updated from the (t−1)-th codebook update operation and 'k' (where k=0, 1, 2, ..., N−1) denotes a codeword index within a codebook.

When using the above Equation 3 and Equation 4 to determine a phase value, the updated codebook of Equation 7 may be expressed in more detail by the following Equation 8a or Equation 8b.

$$B_t = \{b_{t,0}, b_{t,1}, \ldots, b_{t,N-1}\} = \frac{1}{\sqrt{N}}$$

[Equation 8a]

$$\left\{ \begin{pmatrix} 1 \\ e^{-j(\frac{N}{2}-1)\frac{\phi_{range}}{L}} \\ e^{-2j(\frac{N}{2}-1)\frac{\phi_{range}}{2L}} \\ \vdots \\ e^{-(N-1)j(\frac{N}{2}-1)\frac{\phi_{range}}{2L}} \end{pmatrix} b_{t-1,k} \ldots, \right.$$

$$\begin{pmatrix} 1 \\ e^{-j2\frac{\phi_{range}}{L}} \\ e^{-2j2\frac{\phi_{range}}{L}} \\ \vdots \\ e^{-(N-1)j2\frac{\phi_{range}}{L}} \end{pmatrix} b_{t-1,k}, \begin{pmatrix} 1 \\ e^{-j\frac{\phi_{range}}{L}} \\ e^{-2j\frac{\phi_{range}}{L}} \\ \vdots \\ e^{-(N-1)j\frac{\phi_{range}}{L}} \end{pmatrix} b_{t-1,k},$$

$$\begin{pmatrix} 1 \\ 1 \\ 1 \\ \vdots \\ 1 \end{pmatrix} b_{t-1,k}, \begin{pmatrix} 1 \\ e^{j\frac{\phi_{range}}{L}} \\ e^{2j\frac{\phi_{range}}{L}} \\ \vdots \\ e^{(N-1)j\frac{\phi_{range}}{L}} \end{pmatrix} b_{t-1,k},$$

$$\begin{pmatrix} 1 \\ e^{j2\frac{\phi_{range}}{L}} \\ e^{2j2\frac{\phi_{range}}{L}} \\ \vdots \\ e^{(N-1)j2\frac{\phi_{range}}{L}} \end{pmatrix} b_{t-1,k} \ldots, \left. \begin{pmatrix} 1 \\ e^{j\frac{N}{2}\frac{\phi_{range}}{L}} \\ e^{2j\frac{N}{2}\frac{\phi_{range}}{L}} \\ \vdots \\ e^{(N-1)\frac{N}{2}\frac{\phi_{range}}{L}} \end{pmatrix} b_{t-1,k} \right\}$$

$$B_t = \{b_{t,0}, b_{t,1}, \ldots, b_{t,N-1}\} = \frac{1}{\sqrt{N}}$$ [Equation 8b]

$$\left\{ \begin{pmatrix} 1 \\ e^{-j\frac{N}{2}\frac{\phi_{range}}{L}} \\ e^{-2j\frac{N}{2}\frac{\phi_{range}}{2L}} \\ \vdots \\ e^{-(N-1)j\frac{N}{2}\frac{\phi_{range}}{2L}} \end{pmatrix} b_{t-1,k} \cdots, \begin{pmatrix} 1 \\ e^{-j2\frac{\phi_{range}}{L}} \\ e^{-2j2\frac{\phi_{range}}{L}} \\ \vdots \\ e^{-(N-1)j2\frac{\phi_{range}}{L}} \end{pmatrix} b_{t-1,k}, \begin{pmatrix} 1 \\ e^{-j\frac{\phi_{range}}{L}} \\ e^{-2j\frac{\phi_{range}}{L}} \\ \vdots \\ e^{-(N-1)j\frac{\phi_{range}}{L}} \end{pmatrix} b_{t-1,k}, \begin{pmatrix} 1 \\ e^{j\frac{\phi_{range}}{L}} \\ e^{2j\frac{\phi_{range}}{L}} \\ \vdots \\ e^{(N-1)j\frac{\phi_{range}}{L}} \end{pmatrix} b_{t-1,k}, \begin{pmatrix} 1 \\ e^{j2\frac{\phi_{range}}{L}} \\ e^{2j2\frac{\phi_{range}}{L}} \\ \vdots \\ e^{(N-1)j2\frac{\phi_{range}}{L}} \end{pmatrix} b_{t-1,k} \cdots, \begin{pmatrix} 1 \\ e^{j\frac{N}{2}\frac{\phi_{range}}{L}} \\ e^{2j\frac{N}{2}\frac{\phi_{range}}{L}} \\ \vdots \\ e^{(N-1)\frac{N}{2}\frac{\phi_{range}}{L}} \end{pmatrix} b_{t-1,k} \right\}$$

An updated codebook of Equation 8a includes a phase value of 0° and an updated codebook of Equation 8b excludes a phase value of 0°. Advantages for each case are as described previously in Equation 4. Although Equation 8a excludes one maximum phase value having a negative value, one maximum phase value having a positive value may be excluded as an alternative method.

A codeword having the best reception performance based on a received signal, for example, $b_{t,k}$, is selected, using an updated codebook $B_t$ generated by Equation 8a or Equation 8b.

The following Equation 9 shows an example of a codebook update method which can be generated through the (t+1)-th codebook update operation.

$$B_{t+1} = \{b_{t+1,0}, b_{t+1,1}, \ldots, b_{t+1,N-1}\}$$ [Equation 9]

$$= \{P_N(\phi_0), P_N(\phi_1), \ldots, P_N(\phi_{L-1})\} \times b_{t,k}$$

$$= \{P_N(\phi_0) \times b_{t,k}, P_N(\phi_1) \times b_{t,k}, \ldots, P_N(\phi_{L-1}) \times b_{t,k}\}$$

In Equation 9, 't' of $B_{t+1}$ denotes the number of codebook updates. In the first codebook update operation, 't' is set to 1 and may be increased by 1 whenever the update operation is performed. Moreover, $b_{t,k}$ denotes a codeword selected from a codebook updated from an previous update operation, that is, the t-th update operation, and 'k' (where k=0, 1, 2, ..., N−1) denotes a codeword index within a codebook.

When using the above Equation 3 and Equation 4 as a method for determining a phase value, the updated codebook of Equation 9 may be expressed in more detail by the following Equation 10a and Equation 10b.

$$B_t = \{b_{t+1,0}, b_{t+1,1}, \ldots, b_{t+1,N-1}\} =$$ [Equation 10a]

$$\frac{1}{\sqrt{N}} \left\{ \begin{pmatrix} b_t \\ e^{-j\frac{(N-1)}{2}\frac{\phi_{range}}{L}} \\ e^{-2j\frac{(N-1)}{2}\frac{\phi_{range}}{2L}} \\ \vdots \\ e^{-(N-1)j\frac{(N-1)}{2}\frac{\phi_{range}}{2L}} \end{pmatrix} b_{t,k} \cdots, \begin{pmatrix} b_t \\ e^{-j2\frac{\phi_{range}}{L}} \\ e^{-2j2\frac{\phi_{range}}{L}} \\ \vdots \\ e^{-(N-1)j2\frac{\phi_{range}}{L}} \end{pmatrix} b_{t,k}, \begin{pmatrix} 1 \\ e^{-j\frac{\phi_{range}}{L}} \\ e^{-2j\frac{\phi_{range}}{L}} \\ \vdots \\ e^{-(N-1)j\frac{\phi_{range}}{L}} \end{pmatrix} b_{t,k}, \begin{pmatrix} 1 \\ 1 \\ 1 \\ \vdots \\ 1 \end{pmatrix} b_{t,k}, \begin{pmatrix} b_t \\ e^{j\frac{\phi_{range}}{L}} \\ e^{2j\frac{\phi_{range}}{L}} \\ \vdots \\ e^{(N-1)j\frac{\phi_{range}}{L}} \end{pmatrix} b_{t,k}, \begin{pmatrix} b_t \\ e^{j2\frac{\phi_{range}}{L}} \\ e^{2j2\frac{\phi_{range}}{L}} \\ \vdots \\ e^{(N-1)j2\frac{\phi_{range}}{L}} \end{pmatrix} b_{t,k} \cdots, \begin{pmatrix} b_t \\ e^{j\frac{N}{2}\frac{\phi_{range}}{L}} \\ e^{2j\frac{N}{2}\frac{\phi_{range}}{L}} \\ \vdots \\ e^{(N-1)\frac{N}{2}\frac{\phi_{range}}{L}} \end{pmatrix} b_{t,k} \right\}$$

-continued $$B_t = \{b_{t+1,0}, b_{t+1,1}, \ldots, b_{t+1,N-1}\} = \quad \text{[Equation 10b]}$$

$$\frac{1}{\sqrt{N}}\left\{\begin{pmatrix}b_t \\ e^{-j\frac{N}{2}\frac{\phi_{range}}{L}} \\ e^{-2j\frac{N}{2}\frac{\phi_{range}}{2L}} \\ \vdots \\ e^{-(N-1)j\frac{N}{2}\frac{\phi_{range}}{2L}}\end{pmatrix}b_{t,k}\ldots, \begin{pmatrix}b_t \\ e^{-j2\frac{\phi_{range}}{L}} \\ e^{-2j2\frac{\phi_{range}}{L}} \\ \vdots \\ e^{-(N-1)j2\frac{\phi_{range}}{L}}\end{pmatrix}b_{t,k}, \begin{pmatrix}1 \\ e^{-j\frac{\phi_{range}}{L}} \\ e^{-2j\frac{\phi_{range}}{L}} \\ \vdots \\ e^{-(N-1)j\frac{\phi_{range}}{L}}\end{pmatrix}b_{t,k}, \begin{pmatrix}b_t \\ e^{j\frac{\phi_{range}}{L}} \\ e^{2j\frac{\phi_{range}}{L}} \\ \vdots \\ e^{(N-1)j\frac{\phi_{range}}{L}}\end{pmatrix}b_{t,k}, \begin{pmatrix}b_t \\ e^{j2\frac{\phi_{range}}{L}} \\ e^{2j2\frac{\phi_{range}}{L}} \\ \vdots \\ e^{(N-1)j2\frac{\phi_{range}}{L}}\end{pmatrix}b_{t,k}\ldots, \begin{pmatrix}b_t \\ e^{j\frac{N}{2}\frac{\phi_{range}}{L}} \\ e^{2j\frac{N}{2}\frac{\phi_{range}}{L}} \\ \vdots \\ e^{(N-1)\frac{N}{2}\frac{\phi_{range}}{L}}\end{pmatrix}b_{t,k}\right\}$$

An updated codebook of Equation 10a includes a phase value of 0° and an updated codebook of Equation 10b excludes a phase value of 0°. This is as described in Equation 4. Although Equation 10a excludes one maximum phase value having a negative value, one maximum phase value having a positive value may be excluded as an alternative method.

Using an updated codebook $B_{t+1}$ generated as shown in Equation 10a or Equation 10b, a codeword, for example, $b_{t+1,k}$, having the best reception performance based on a received signal is selected.

Codebook update operations are performed several times by the above-described codebook updating mode. After the prescribed number of update operations is performed, codebook updating may be restarted using a base DFT codebook matrix or by resetting a phase value to 0 in order to prevent potential errors. Alternatively, a threshold value is preset and codebook updating may be restarted using the base DFT codebook matrix when the reception performance of a mobile station is worse than the preset threshold value.

A codeword value of a codebook suitable for a current channel status varies due to the movement of a mobile station or variations of communication environments. In particular, in beamforming, desired directions of a beam are changed by movement of the mobile station. Accordingly, a channel status is reflected and a codebook can be updated using a codebook updating mode according to the embodiment of the present invention. If a specific codeword having good reception performance is selected from the updated codebook and is fed back, feedback information reflecting variable channels can be transmitted without increasing feedback overhead, thereby improving communication performance.

When updating the codebook, a new codeword value can be determined using a previous feedback codeword value. Therefore, a useful effect in a location tracking function of a mobile station in a MIMO system using codebook-based beamforming can be expected.

When applying a codebook-based MIMO precoding or diversity scheme, or a codebook-based beamforming scheme, basic technical features of a method performing feedback by updating a codebook can be shared. However, if antenna intervals are different, an additional construction may be used. Parameters, such as a phase range, a phase interval and the maximum number of codebook updates, may use optimized values according to system and communication environments rather than specific fixed values.

Hereinafter, an example of applying the above-described codebook update method to a codebook-based beamforming scheme will be described. When applying the codebook update method to the codebook-based beamforming scheme, since it is possible to track the location of a mobile station considering the movement of the mobile station, this may be called a location tracking method. For the present invention, multiple antennas in a transmitting end may use linear antennas, each interval of which is $$\frac{\lambda}{2}.$$

This exemplary embodiment is applied to a codebook-based beamforming scheme and may perform beamforming and/or location tracking using a DFT matrix and a location tracking matrix according to the number of antennas. A common reference signal (RS) is used for channel estimation and therefore it may not be necessary to transmit an additional dedicated RS or a dedicated pilot channel for beamforming. Moreover, since information about a channel is configured using a codebook and is fed back using an index, channel status information is obtained by estimation in an uplink channel as in a beamforming scheme of a conventional FDD mode, thereby solving a problem which may be generated due to an error between uplink and downlink channels. Furthermore, since a desired direction of a beam is changed due to the movement of a mobile station, a beamforming codebook is updated using the above-described method and an antenna weight for beamforming is applied using the updated codebook, thereby performing location tracking according to the movement of the mobile station.

In applying the codebook update method to the beamforming scheme, a phase value $\phi_i$ may be determined among $$0 \leq \phi_i < \frac{2\pi}{N}$$

(where, N is the number of transmit antennas and/or the number of virtual beamforming patterns). In determining the phase value $\phi_i$, a phase interval $\Delta\phi$ may be determined by dividing an angle $\phi_{range}$ of a prescribed range toward right and left with codebook size. Each phase value may be determined by setting 0° to an initial value or by setting a phase value determined during previous feedback transmission to the initial value, and by adding or subtracting integral times of a phase interval to or from the initial value. Especially, in beamforming, locations of a mobile station and a base station can be tracked by setting a straight line to 0° which is a center of the angle $\phi_{range}$ of a prescribed range.

Namely, the above-described codebook update method may be applied to the location tracking of the mobile station as follows. A receiving end may choose a codeword $b_k$ having the best reception performance from among codewords of a codebook for beamforming. Next, the codebook may be updated such that a beam pattern having a symmetric phase interval $\Delta\phi$ corresponding to a codebook size may be generated within the phase angle $\phi_{range}$ having a search range which is range symmetrical about the codeword $b_k$. A beam is formed by applying an antenna weight corresponding to a codeword selected from the updated codebook and thus the location tracking of the mobile station can be achieved.

The codebook update process may be performed several times. The location tracking operation may also be performed several times using the above-described location tracking method. However, after the location tracking operations are performed a given number of times, location tracking can be restarted from the beginning using a base DFT codebook matrix or by resetting a phase value to 0° in order to prevent potential errors. Alternatively, a threshold value is preset, and if the reception performance of a mobile station does not satisfy the preset threshold value, location tracking may be restarted from the beginning using the base DFT codebook matrix.

Figure 2:
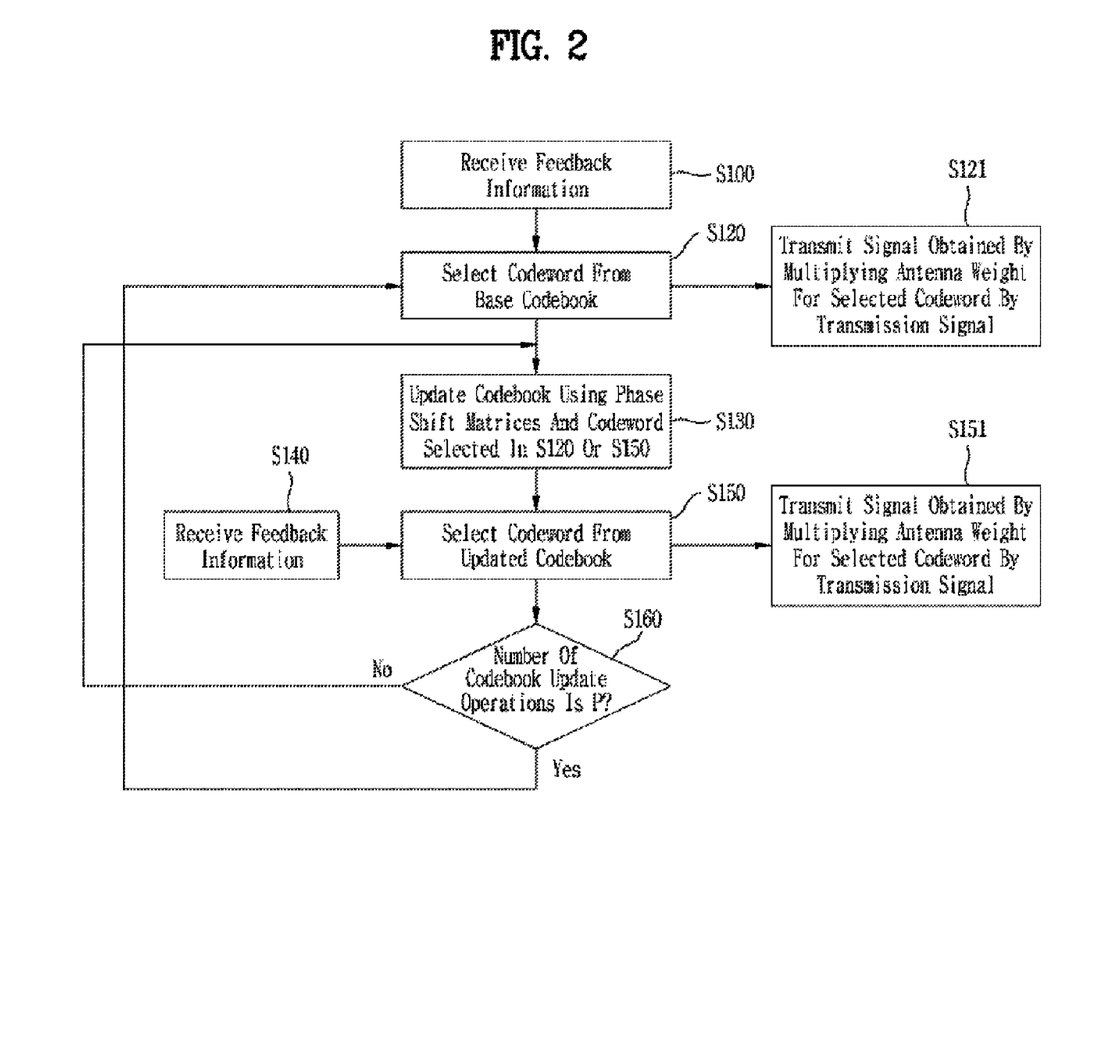
FIG. 2 is a flow chart illustrating a method for tracking the location of a mobile station in a transmitting end according to an exemplary embodiment of the present invention.

FIG. 2 is a flow chart illustrating a location tracking method of a mobile station in a transmitting end according to an exemplary embodiment of the present invention.

A transmitting end receives feedback information from a receiving end, i.e., a corresponding mobile station in step S100. The feedback information may be codeword index information of a codebook. A codeword is selected from a base codebook based on the feedback information in step S120. The transmitting end transmits a signal obtained by multiplying an antenna weight corresponding to the selected codeword by a transmission signal in step S121. A DFT matrix may be used as the base codebook.

The codebook is updated in step S130. For example, the codebook is updated using the codeword selected in step S120 and a plurality of phase shift matrices having phase values as parameters. To update the codebook, a method may be used for determining a plurality of phase values, generating phase shift matrices for the determined phase values, and multiplying each of the generated phase shift matrices by the codeword selected in step S120. The codebook update method may be shared with the receiving end so that the transmitting end and the receiving end can update the codebook with the same rule.

The number of the plurality of phase values may be determined by the number of feedback bits. For example, if the number of feedback bits is 3, since channel statuses transmitted by 3 bits is 8 ($=2^3$), eight (8) phase shift matrices can be generated by determining 8 phase values.

The receiving end may select an optimal codeword from the updated codebook and feed back the selected codeword. Then the transmitting end receives the feedback information in step S140 and selects a codeword from the updated codebook for location tracking of the mobile station in step S150. The transmitting end transmits a signal obtained by multiplying an antenna weight for the selected codeword by a transmission signal in step S151.

Thus a beamforming scheme can be performed using the updated codebook by multiplying the antenna weight to which location tracking of the mobile station is applied. When continuously updating the codebook, the codebook update operation may be performed based on previous transmission up to a prescribed number of times. In FIG. 2, the number of codebook update operations is set to P. If the number of codebook update operations is not P, the codebook is updated based on the previously selected codeword.

For example, the codebook is again updated at step S130 to perform the codebook update operation once more. A method for updating the codebook is similar to the method used in the previously described step S130. In this case, however, the codeword selected in step S150 is used unlike as in the previously described step S130. Using such a codebook update operation, the codebook can be updated considering the movement of the mobile station without additional feedback overhead.

If the number of codebook update operations becomes the prescribed number of times, P, in step S160, a codebook is selected based on the base codebook in step S120 and the codebook update operation is performed again. This provides an opportunity to correct accumulated errors due to repeated codebook update operations. Such an initialization process entails resetting a phase of the phase shift matrix to 0° at a period of P.

In a codebook update mode, a codebook size L according to the number of feedback bits, a phase interval, a repetition number of times, P, for resetting a codebook phase value, a feedback codeword index transmission period, etc. may be optimally designed in consideration of various factors such as codebook update performance according to a channel status, the amount of overhead of a feedback codeword index, and the like.

Figure 3:
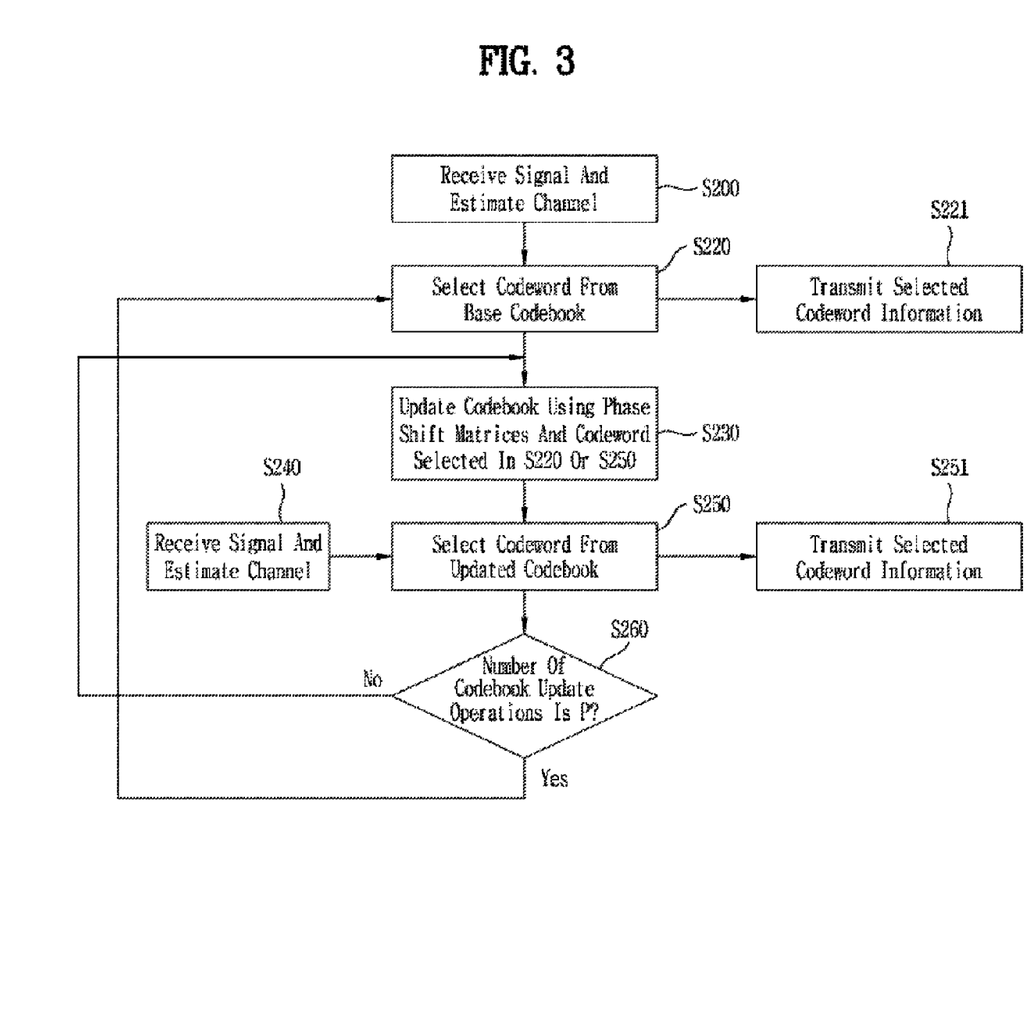
FIG. 3 is a flow chart illustrating a method for tracking the location of a mobile station in a receiving end according to an exemplary embodiment of the present invention.

FIG. 3 is a flow chart illustrating a location tracking method of a mobile station in a receiving end according to an exemplary embodiment of the present invention.

A receiving end receives a signal transmitted by a transmitting end and estimates a channel based on the received signal in step S200. A signal used for channel estimation may be a common RS as described previously.

An optimal codeword is selected from a base codebook based on the estimated channel in step S220, and the selected codeword information is fed back to the transmitting end in step S221.

In step S230, the codebook is updated using the same codebook update method used in the transmitting end. Namely, a codebook which can form a beam considering a plurality of phase values around a beam generated by previous feedback may be generated using a phase shift matrix and the codeword selected in step S220.

The receiving end receives a signal and estimates a channel based on the received signal again in step S240. The receiving end selects an optimal codeword from the updated codebook based on the estimated channel information in step S250, and transmits the selected codeword information to the transmitting end in step S251.

If the number of codebook update operations becomes the prescribed number of times, P, in step S260, a codebook is selected based on the base codebook in step S220 and the codebook update operation is performed again. This provides an opportunity to correct accumulated errors due to repeated codebook update operations. Such an initialization process entails resetting a phase of the phase shift matrix to 0° at a period of P.

Figure 4:
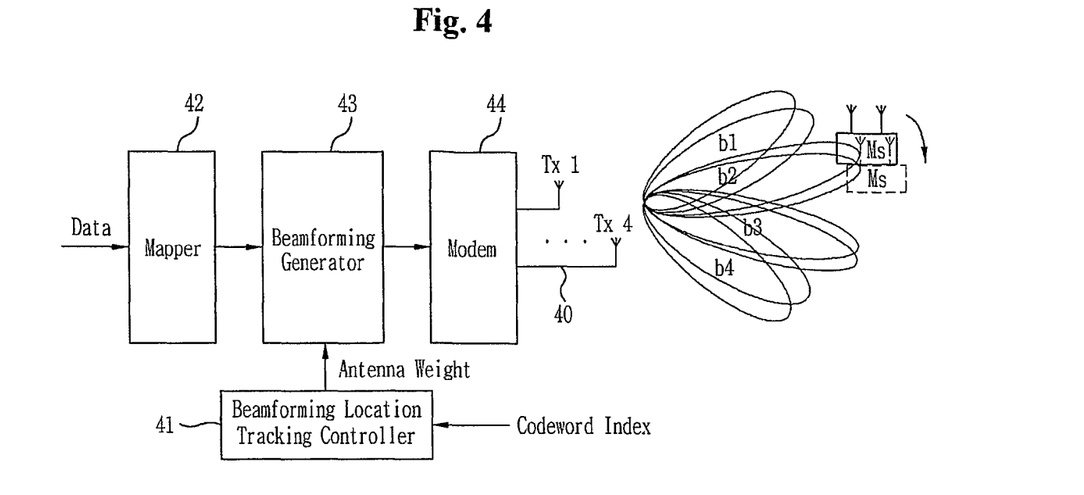
FIG. 4 is a view illustrating an example of the structure of a transmitting end to which the exemplary embodiment of the present invention is applied.

FIG. 4 is a view illustrating an example of the structure of a transmitting end according to an exemplary embodiment of the present invention.

A transmitting end for applying a beamforming scheme includes a plurality of antennas 40 for performing a MIMO function, a beamforming location tracking controller 41, a mapper 42, a beamforming generator 43, and a modem 44.

The transmitting end may transmit a signal through the plurality of antennas 40, or receive a signal or feedback information from a receiving side through the plurality of antennas 40. Location tracking of a mobile station may be performed based on the feedback information received through the beamforming location tracking controller 41. That is, the above-described codebook update operation may be performed in the beamforming location tracking controller 41. The mapper 42 may re-configure a signal arrangement suitable for inverse Fourier fast transform (IFFT) in order to convert transmission data into an OFDM signal and a multiple antenna signal. The beamforming generator 43 multiplies an antenna weight generated from the beamforming location tracking controller 41 by transmission data for each antenna generated from the mapper 42. The modem 44 performs IFFT upon the multiplied transmission data, converts a frequency-axis signal into a time-axis signal, and transmits the converted signal through the antennas 40.

It is apparent that the present invention may be embodied by a combination of claims which do not have an explicit cited relation in the appended claims or may include new claims by amendment after application.

The exemplary embodiment of the present invention may be achieved by various means, for example, hardware, firmware, software, or a combination thereof. In a hardware configuration, a method for transmitting feedback information and a method for transmitting precoding information in a codebook-based MIMO system according to the exemplary embodiment of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method for transmitting feedback information and a method for transmitting precoding information in a codebook-based MIMO system according to the exemplary embodiments of the present invention may be achieved by a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting beamforming information in a multiple-input multiple-output (MIMO) system using a codebook-based beamforming scheme, the method comprising:
   receiving a signal and estimating a reception channel; and
   transmitting beamforming information selected based on the estimated reception channel from a codebook which is updated using a plurality of phase shift matrices and using previous beamforming information,
   wherein each of the plurality of phase shift matrices comprising a phase value as a parameter, and
   wherein each of the plurality of phase shift matrices is determined by determining the phase value, codebook codewords are determined by multiplying each of the determined phase shift matrices by a vector component according to the estimated reception channel, and the codebook is configured to include the determined codebook codewords.

2. The method of claim 1, wherein the beamforming information is codeword index information contained in the codebook.

3. The method of claim 1, wherein the phase value is determined by adding or subtracting an integral number of times of a phase interval, based on at least one of the estimated reception channel and a straight line connecting a transmitting end and a receiving end.

4. The method of claim 3, wherein the phase interval is generated by equally dividing a predetermined phase range into intervals corresponding to the number of feedback bits.

5. The method of claim 1, wherein the method is repeated a preset number of times.

6. The method of claim 1, wherein the phase value is reset to 0° at a preset repetition period.

* * * * *